Patented Nov. 18, 1952

2,618,632

UNITED STATES PATENT OFFICE 2,618,632

MIXED CELLULOSE ETHER AND PREPARATION THEREOF

Eugene D. Klug, Wilmington, Del., assignor to Hercules Powder Company, Wilmington, Del., a corporation of Delaware No Drawing. Application April 5, 1949, Serial No. 85,725

15 Claims. (Cl. 260—231)

This invention relates in general to a new cellulose derivative and, in particular, to a new mixed cellulose ether and the process for the preparation thereof.

It has been known in the art that cellulose derivatives such as, for example, cellulose ethers and the like, can be prepared to exhibit desirable and valuable properties and that the art is constantly seeking new derivatives having unique and improved properties. Now in accordance with the present invention a new, mixed carboxyalkylated hydroxyalkyl cellulose ether is prepared by reacting cellulose with an hydroxyalkylating agent, for example, in the presence of caustic alkali and subsequently, preferably without separating the hydroxyalkylated cellulose from the reaction mixture in which it is formed, reacting said hydroxyalkylated cellulose with a carboxyalkylating agent, also preferably in the presence of caustic alkali. In a preferred embodiment of this invention, the entire combination etherification process is carried out in the presence of an organic liquid which is a nonsolvent for the cellulose and the cellulose ether, for example, and relatively inert to the etherifying agents and including the three- and four-carbon aliphatic alcohols, dioxane, tetrahydrofuran and diethylether of ethylene glycol, the organic liquid being present in a quantity sufficient to maintain the resulting cellulose ether in a solid, undissolved state throughout the process. The product resulting from the process as herein defined is a new, mixed cellulose ether having valuable properties and being useful as will be apparent to those skilled in the art.

The mixed cellulose ethers prepared according to this invention contain at least about 0.05 hydroxyethyl group and at least about 0.05 carboxymethyl group for each anhydro glucose unit, and in preferred embodiments of the invention, the mixed cellulose ethers contain between about 0.15 and about 0.75 hydroxyethyl group for each anhydro glucose unit in the cellulose molecule and between about 0.2 and about 0.9 carboxymethyl group, the total degree of substitution being at least about 0.50 substituent groups for each anhydro glucose unit in the cellulose molecule. The cellulose ethers within the preferred range are characterized by being soluble in water and not precipitated from a 1% water solution with an equal weight of 10% barium chloride solution or 10% zinc nitrate solution and are further characterized by solubility in aqueous solutions having a pH of 0.2. It is presently understood and believed that the new mixed cellulose ethers according to this invention are further characterized by containing in their structure a significant number of carboxymethylated hydroxyethyl groups, although it is not intended to limit the scope of this invention to such modified substituent groups nor to their formation.

The general nature of the invention having been set forth, the following examples are presented in specific illustration but not in limitation thereof.

*Example 1*

To a vigorously stirred slurry of 30 parts by weight cotton linters in 750 parts by volume 87% isopropanol was added 60 parts by weight of 50% aqueous sodium hydroxide dropwise over a period of 17 minutes at room temperature. After 30 minutes of additional stirring, a solution of 8.9 parts by weight of ethylene oxide in 50 parts by volume of anhydrous isopropanol was added thereto and the temperature was slowly raised to 69° C. over a period of one hour and was then maintained at a temperature between 68 and 73° C. for a period of about 4 hours.

At the end of the 4-hour period, there was added to the reaction mixture without intermediate treatment thereof, a solution of 35 parts by weight monochloracetic acid dissolved in 35 parts by volume of anhydrous isopropanol, this solution being added over a period of 15 minutes. The resulting mixture was continuously stirred for an additional two hours and ten minutes after all of the monochloracetic acid had been added, whereupon heating was stopped and the product was allowed to cool and to stand at room temperature for about 15 hours. The reaction mixture at this stage was a fibrous slurry of a carboxymethylated hydroxyethyl cellulose.

To recover the cellulose ether from the reaction mixture, the liquor was drained off and the fibrous cellulose ether was stirred in 70% methanol, neutralized to phenolphthalein with acetic acid, washed free of salts with 70% methanol, dehydrated with anhydrous methanol, and dried at 70° C. The product was analyzed for hydroxyethoxyl substitution according to the method of P. W. Morgan (Industrial & Engineering Chemistry, 18, 500–504, 1946) and was indicated to have an hydroxyethyl substitution in the cellulose molecule of about 0.22 hydroxyethyl group per anhydro glucose unit. The product likewise was analyzed for carboxymethyl substitution by conductometric titration with an indicated carboxymethyl substitution of about 0.62 carboxymethyl group per anhydro glucose unit. A 2% aqueous solution of the product was fiber-free and very clear and characterized by a negligible degree of granularity. The product was characterized by being readily soluble in aqueous solution even at a pH as low as 0.2 and was not precipitated from 1% aqueous solution with an equal weight of 10% barium chloride solution or with an equal weight of 10% zinc nitrate solution.

*Example 2*

The procedure of Example 1 was repeated employing an hydroxyethylation period of 5 hours at 60–68° C. and a carboxymethylation period of 3.5 hours at the same temperature. The amounts of ingredients employed were 30 parts cotton linters, 750 parts by volume 87% isopropanol, 36 parts by weight 50% sodium hydroxide, 8.9 parts by weight ethylene oxide in 50 parts by volume anhydrous isopropanol, 21 parts by weight monochloracetic acid; the product produced thereby was characterized by a degree of hydroxyethyl substitution of 0.26 group and carboxymethyl substitution of 0.45 group per anhydro glucose unit. The product was substantially similar in properties to the product of Example 1, being excellently soluble in water to yield a clear solution and not being precipitatable by barium chloride or zinc nitrate according to the procedure described in the previous example.

*Example 3*

A mixed cellulose ether, first hydroxyethylated and subsequently carboxymethylated, was prepared by a process similar to that of Example 1, employing the following proportions of ingredients: 30 parts by weight of shredded cotton linters, 750 parts by volume of 87% isopropanol, 60 parts by weight of 20% aqueous sodium hydroxide, 2.66 parts by weight of ethylene oxide dissolved in 50 parts by volume of anhydrous isopropanol, and 9.0 parts by weight of monochloracetic acid dissolved in 25 parts by volume of anhydrous isopropanol. The 20% solution of sodium hydroxide was added to the vigorously stirred slurry of cotton linters in isopropanol over a period of 15 minutes at about 27° C. and after about 1 hour's additional stirring, the ethylene oxide solution was added. The temperature was then gradually raised to 69° C. in 1 hour and 20 minutes, and maintained at about this temperature for 3 hours and 40 minutes. The monochloracetic acid solution was then added over a period of 15 minutes and the temperature maintained at 69° C. to 79° C. for 4 hours thereafter. After standing at room temperature for about 15 hours, the product was recovered as described in Example 1 to yield a mixed cellulose ether having an hydroxyethyl substitution of 0.17 and a carboxymethyl substitution of 0.44 group per anhydro glucose unit. A 2% aqueous solution of the product was clear, fiber-free and substantially nongranular.

The water-solubility of this product in distilled water was compared with water-solubility of a carboxymethyl cellulose having no hydroxyethylation, and it was found that the mixed ether having a total substitution of 0.61 substituent group had substantially an equal level of water-solubility as compared with a carboxymethyl cellulose having a total substitution of 0.78 substituent group per anhydro glucose unit.

The general process contemplated according to this invention and, as illustrated in the examples, is a two-stage etherification process for the preparation of the new mixed cellulose ether. According to the first step of this reaction, a suitable cellulose material is hydroxyalkylated employing a reagent known to the art such as, for example, a lower alkylene oxide, alkylene chlorhydrin, or the like, preferably in the presence of caustic alkali. Thus, for example, in the first or hydroxyalkylation step, there may be employed ethylene oxide, propylene oxide, butylene oxide, or the corresponding chlorhydrin, in each case preferably in the presence of caustic alkali. In like manner, the second step of the etherification reaction comprises treating the hydroxyethyl cellulose ether, preferably in the presence of caustic alkali, with a suitable carboxyalkylating agent such as, for example, a chlorinated lower fatty acid, preferably the monochlorinated acid or its alkali salt, an activated vinyl compound which will react with a cellulosic hydroxyl group, the vinyl compound having a carboxyl group or a group convertible thereto such as, for example, acrylic esters, and the like.

In the preparation of the cellulose ether according to this invention, there is employed any appropriate cellulose raw material such as, preferably, chemical cotton or wood pulp of the type conventionally used in chemical reactions. As is known to the art, the cellulose material may be in any of the usual physical forms such as bulk dried, sheet dried, mechanically subdivided dried cellulose, or cellulosic material in other form, generally in particles sufficiently small to permit easy reaction thereon by the etherifying agents.

It will be understood and apparent to those skilled in the art that there may be employed the type of reaction generally known as a slurry process wherein the cellulosic material and cellulose ether are maintained substantially in the solid or fibrous condition or, alternatively, a process may be employed wherein the cellulose ether is partly or substantially dissolved in the reaction medium. According to the present preferred embodiment of the invention, the cellulose ether is maintained largely in an undissolved state, and there is employed as a diluent for the reaction an organic liquid including the three- and four-carbon alcohols, dioxane, tetrahydrofuran, and the diethylether of ethylene glycol. This organic diluent is selected to be such that the cellulose raw material and the cellulose ethers resulting from the reactions are relatively insoluble in the reaction mixture and, furthermore, the nature of the diluent and the proportions of materials are selected so that good stirring and mixing may be obtained under optimum economic conditions. In general, employing the diluents named herein, a ratio of diluent to cellulose may be maintained between about 5 and about 50 parts of diluent to one part of cellulose and, preferably, a ratio of between about 10:1 and about 25:1.

In the examples, there is shown a unitary reaction process wherein the cellulose is first hydroxyethylated and subsequently carboxymethylated without intermediate treatment or adjustment of the reaction mixture, such being a preferred procedure within the scope of the invention. This procedure may be modified if desired to carry out the first reaction under conditions optimum for the hydroxyethylation step and subsequently adjusting the concentration of ingredients such as, for example, the caustic concentration, to attain conditions optimum for the carboxymethylation step. It is generally observed, however, that the properties and conditions of operation can be satisfactorily adjusted and maintained with a single adjustment of conditions prior to the hydroxyethylation step and that the reaction mixture resulting from this step will be generally satisfactory for the subsequent carboxymethylation step without further alteration or change therein. Thus, where a moderate degree of substitution of both substituent groups is desired, a single control procedure is employed without intermediate processing of the first reaction mixture. It will be apparent, however, that additional ingredients, if desired, may be added to reaction mixture after the hydroxyethylation step; particularly, such addition may advantageously be employed in the event that a relatively high degree of carboxymethylation is desired, in which case the addition of alkali to the reaction mixture between the hydroxyethylation and carboxymethylation steps of the process will render the mixture in a condition better suited for extensive carboxymethylation.

In adjusting and maintaining the desired proportions and relative amounts of the reactants, it is observed that when an hydroxyethylating agent such as ethylene oxide is employed, there is substantially no consumption of alkali in the first step of the reaction process but that if other hydroxyethylation agents such as, for example, ethylene chlorhydrin, are employed, there may be alkali consumption and, consequently, a requirement for the addition of added amounts of alkali prior to the first step of the reaction. It will accordingly be apparent that the amounts and proportions of the ingredients may be varied by changing the nature of the reagents employed for the etherification reactions and that an intermediate addition of caustic will more frequently be desirable when an alkali-consuming hydroxyethlating agent is employed.

In general, for the first or hydroxyalkylation step of the reaction, it is indicated that the caustic content or the like should be within a range of about 0.05 to about 10 parts of caustic per part of cellulose and that a preferred range for this content is between about 0.2 and about 0.5 part thereof. Likewise, the water content of the reaction mixture may be varied from about 0.02 to 3.0 parts of caustic per part of water with a preferred range of about 0.04 to about 1.0. Within these general ranges as set forth, preferred conditions for optimum operation have been established for an arbitrary dilution system containing about 15 parts by volume of organic diluent per part by weight of cellulose. Under this dilution condition, an optimum cellulose to caustic ratio is about 0.3 to 0.4 part caustic per part of cellulose with a corresponding optimum of water to cellulose ratio between about 1.6 and about 2.0 parts of water per part of cellulose. Thus, by correlation of these ratios, it is apparent that an optimum ingredient ratio for this degree of dilution is about 2 parts of 15–20% sodium hydroxide per part of cellulose and it will be understood, of course, that changes in the dilution ratio will give corresponding and compensating minor changes in the optimum conditions of caustic and water content for this reaction step.

In the carboxyalkylation step, a further variant is introduced inasmuch as the optimum proportions and ratios of ingredients will depend to a certain extent on the desired degree of carboxyalkyl substitution which is to be introduced into the cellulose ether molecule. In general, however, for the carboxyalkylation step, the relative proportions of ingredients will be about 0.1 to about 3.0 parts caustic per part cellulose, depending also upon the amount of carboxyalylating agent employed, and between about 0.02 and about 3.0 parts caustic per part water with a preferred range of about 0.04 to about 1.0 part caustic per part water. In the same manner, the proportions of the carboxyalkylating agent, such as for example, chloracetic acid or the like with relation to the amount of cellulose ether, will vary with the degree of substitution desired and generally will be between about 0.3 and about 3 parts carboxyalkylating agent per part of cellulose ether. Inasmuch as the preferred carboxyalkylating agent, namely, a chlorinated fatty acid or salt thereof, is a caustic-consuming reagent, a further requirement for the carboxyalkylation step of the reaction is the presence of at least a minimum molar ratio of caustic as compared with the amount of carboxyalkylation reagent employed and thus, for example, it is preferred that a molar ratio of caustic to the chlorinated lower fatty acid be maintained at at least about 2:1.

In the same manner that variation of proportions and ratios of ingredients is possible, it is apparent that reaction temperatures and conditions for the etherification reactions may be varied within relatively wide limits. Thus, for example, a reaction temperature for the hydroxyethylation may be between about 20° C. and about 100° C. and the reaction time varied correspondingly, being relatively long, for example, about one day at a low temperature such as about 20° C. and being substantially shorter, for example, about 2 to 3 hours, at a high temperature. For optimum ease and efficiency of operation, a preferred reaction temperature is generally in the range of about 50° C. to 75° C., at which temperature a reaction time of about 5 hours is found to be adequate. In a like manner, the carboxymethylation step of the reaction may be carried out over a wide range of temperatures such as, for example, about 20° C. to about 100° C. with a preferred range of temperature being again about 50° C. to about 75° C. and a corresponding preferred reaction time in the range of about 2 to about 5 hours.

It will at once be apparent to those skilled in the art that numerous modifications and variations in the operating procedure may be made within the scope of the invention and without departing therefrom. Thus, for example, conventional methods of preparing an alkali cellulose for use in the first etherification step of the reaction may be employed and such conventional methods are well-known in the art. Likewise, it will be apparent that variety of choice is available in the selection of the hydroxyethylating and the carboxymethylating agents and in the same manner, methods of purification and isolation of the resulting cellulose ether, when such purification or isolation is desired, will be apparent to those skilled in the art and the selection of ingredients and conditions for the various steps may readily be made.

The new mixed cellulose ether according to this invention and prepared as described in the examples or with reasonable variations as will be apparent to the art, is characterized by novel properties and improved utility in comparison with cellulose ethers known to the art and the nature and properties of the ether will vary, of course, with different degrees of substitution of the two substituents. It has been found, however, in general, that desirable properties are imparted through degrees of substitution in the cellulose molecule of hydroxyethyl groups or carboxymethyl groups as low as about 0.05 of either or both groups per anhydro glucose unit and that certain of the effects of the ether groups such as, for example, water-solubility and the like, are strengthened with increased amounts of the substituent groups substantially up to the limit of the capacity of the cellulose molecule to receive such groups. Within the broad range of operability, it has been found, for example, that a mixed cellulose ether of optimum general properties has a degree of substitution of about 0.15 to about 0.75 hydroxyethyl group per anhydro glucose unit and about 0.2 to 0.9 carboxymethyl group, with a total substitution above about 0.5. As set forth and described in the examples, the mixed cellulose ethers according to this invention are characterized not only by increased water-solubility, but also by water-solubility in the presence of ionic materials which causes precipitation of prior cellulose ethers. Furthermore, this desirable water-solubility is obtained at a lower degree of total substitution than required for cellulose derivatives previously known to the art.

The cellulose ethers as thus defined are characterized by utility where other cellulose ethers are employed. As a specific illustration of one advantageous property of these new cellulose derivatives, it has been found that a cellulose ether within this invention containing about 0.7 total substituent group per anhydro glucose unit is superior to a simple carboxymethyl cellulose ether having about 0.7 carboxymethyl group as a detergent aid to prevent deposition of suspended particles and, furthermore, a carboxymethylated hydroxethyl cellulose having a total substitution of about 0.6 was fully equal to the more highly substituted carboxymethyl cellulose. For example, a standard test employing as a detergent a composition supplied under the trade name Nacconol NR (an alkylaryl sulfonate, supplied by the Allied Chemical & Dye Corporation) combined with equal amounts of carboxymethyl cellulose and of the carboxymethylated hydroxyethyl cellulose with the following degrees of substitution yielded the following comparative redepositions:

|  | Percent |
|---|---|
| Detergent alone, without cellulose ether | 100 |
| 0.7 substituted carboxymethyl cellulose | 68 |
| 0.42 carboxymethyl, 0.18 hydroxethyl cellulose | 49 |
| 0.43 carboxymethyl, 0.31 hydroxyethyl cellulose | 61 |
| 0.31 carboxymethyl, 0.35 hydroxyethyl cellulose | 66 |
| 0.31 carboxymethyl, 0.28 hydroxyethyl cellulose | 70 |

It will be understood that in addition to this specific advantageous use, the new cellulose ethers may be employed as general thickening agents, pigment dispersing materials, emulsion stabilizers, printing paste additives, adhesives and binders, textile finishing agents, film-forming agents, creaming agents, pharmaceutical preparations, and the like. Because of their compatibility with various inorganic salts and the like, the new cellulose ethers may be employed as such or, if desired, in the form of various metallic salts thereof as well as their salts with other basic materials such as, for example, amines and the like.

What I claim and desire to protect by Letters Patent is:

1. A process for preparing a mixed carboxy- and hydroxy-lower alkyl cellulose ether comprising first introducing into cellulose at least about 0.05 hydroxyalkyl group per anhydroglucose unit by reacting cellulose with a lower hydroxyalkylating agent, and subsequently, without separating the hydroxyalkyl cellulose thus formed from the reaction mixture, introducing into said hydroxyalkyl cellulose at least about 0.05 carboxyalkyl group per anhydroglucose unit by reacting said hydroxyalkyl cellulose with a lower carboxyalkylating agent, the total amount of hydroxyalkyl and carboxyalkyl substituent groups thus introduced being at least about 0.5 per anhydroglucose unit to produce a water-soluble carboxyalkyl hydroxyalkyl cellulose ether, the entire process being carried out in the presence of at least one organic solvent of the group consisting of the 3- and 4-carbon aliphatic alcohols, dioxane, tetrahydrofuran and the diethyl ether of ethylene glycol in a quantity sufficient to maintain the cellulose ether in a solid, undissolved state throughout the process.

2. A process for preparing a mixed carboxy- and hydroxy-lower alkyl cellulose ether comprising first introducing into cellulose at least about 0.05 hydroxyalkyl group per anhydroglucose unit by reacting cellulose with a lower hydroxyalkylating agent, and subsequently, without separating the hydroxyalkyl cellulose thus formed from the reaction mixture, introducing into said hydroxyalkyl cellulose at least about 0.05 carboxyalkyl group per anhydroglucose unit by reacting said hydroxyalkyl cellulose with a lower carboxyalkylating agent, the total amount of hydroxyalkyl and carboxyalkyl substituent groups thus introduced being at least about 0.5 per anhydroglucose unit to produce a water-soluble carboxyalkyl hydroxyalkyl cellulose ether, the entire process being carried out in the presence of isopropanol in a quantity sufficient to maintain the cellulose ether in a solid, undissolved state throughout the process.

3. A process for preparing a mixed carboxy- and hydroxy-lower alkyl cellulose ether comprising first introducing into cellulose at least about 0.05 hydroxyalkyl group per anhydroglucose unit by reacting cellulose with a lower hydroxyalklating agent, and subsequently, without separating the hydroxyalkyl cellulose thus formed from the reaction mixture, introducing into said hydroxyalkyl cellulose at least about 0.05 carboxyalkyl group per anhydroglucose unit by reacting said hydroxyalkyl cellulose with a lower carboxyalkylating agent, the total amount of hydroxyalkyl and carboxyalkyl substituent groups thus introduced being at least about 0.5 per anhydroglucose unit to produce a water-soluble carboxyalkyl hydroxyalkyl cellulose ether, the entire process being carried out in the presence of tertiary butyl alcohol in a quantity sufficient to maintain the cellulose ether in a solid, undissolved state throughout the process.

4. A process for preparing a mixed carboxy- and hydroxy-lower alkyl cellulose ether comprising first introducing into cellulose at least about 0.05 hydroxyalkyl group per anhydroglucose unit by reacting cellulose with a lower hydroxyalkylating agent, and subsequently, without separating the hydroxyalkyl cellulose thus formed from the reaction mixture, introducing into said hydroxyalkyl cellulose at least about 0.05 carboxyalkyl group per anhydroglucose unit by reacting said hydroxyalkyl cellulose with a lower carboxyalkylating agent, the total amount of hydroxyalkyl and carboxyalkyl substituent groups thus introduced being at least about 0.5 per anhydroglucose unit to produce a water-soluble carboxyalkyl hydroxyalkyl cellulose ether, the entire process being carried out in the presence of dioxane in a quantity sufficient to maintain the cellulose ether in a solid, undissolved state throughout the process.

5. A process for preparing a mixed carboxy- and hydroxy-lower alkyl cellulose ether comprising first introducing into cellulose at least about 0.05 hydroxyalkyl group per anhydroglucose unit by reacting cellulose with a lower alkylene oxide in the presence of caustic alkali, and subsequently, without separating the hydroxyalkyl cellulose thus formed from the reaction mixture, introducing into said hydroxyalkyl cellulose at least about 0.05 carboxyalkyl group per anhydroglucose unit by reacting said hydroxyalkyl cellulose with a carboxyalkylating agent of the group consisting of lower halogenated fatty acids, the alkali salts thereof and mixtures thereof, the total amount of hydroxyalkyl and carboxyalkyl substituent groups thus introduced being at least about 0.5 per anhydroglucose unit to produce a water-soluble carboxyalkyl hydroxyalkyl cellulose ether, the entire process being carried out in the presence of at least one organic solvent of the group consisting of the 3- and 4-carbon aliphatic alcohols, dioxane, tetrahydrofuran and the diethyl ether of ethylene glycol in a quantity sufficient to maintain the cellulose ether in a solid, undissolved state throughout the process.

6. A process for preparing a mixed carboxy- and hydroxy-lower alkyl cellulose ether comprising first introducing into cellulose at least about 0.05 hydroxyalkyl group per anhydroglucose unit by reacting cellulose with a lower alkylene chlorohydrin in the presence of caustic alkali, and subsequently, without separating the hydroxyalkyl cellulose thus formed from the reaction mixture, introducing into said hydroxyalkyl cellulose at least about 0.05 carboxyalkyl group per anhydroglucose unit by reacting said hydroxyalkyl cellulose with a carboxyalkylating agent of the group consisting of lower halogenated fatty acids, the alkali salts thereof and mixtures thereof, the total amount of hydroxyalkyl and carboxyalkyl substituent groups thus introduced being at least about 0.5 per anhydroglucose unit to produce a water-soluble carboxyalkyl hydroxyalkyl ether, the entire process being carried out in the presence of at least one organic solvent of the group consisting of the 3- and 4-carbon aliphatic alcohols, dioxane, tetrahydrofuran and and the diethyl ether of ethylene glycol in a quantity sufficient to maintain the cellulose ether in a solid, undissolved state throughout the process.

7. A process for preparing a mixed carboxymethyl hydroxyethyl cellulose ether comprising first introducing into cellulose at least about 0.05 hydroxyethyl group per anhydroglucose unit by reacting cellulose with ethylene oxide in the presence of caustic alkali, and subsequently, without separating the hydroxyethyl cellulose thus formed from the reaction mixture, introducing into said hydroxyethyl cellulose at least about 0.05 carboxymethyl group per anhydroglucose unit by reacting said hydroxyethyl cellulose with a carboxymethylating agent of the group consisting of monochloroacetic acid, the alkali salts thereof and mixtures there, the total amount of hydroxyethyl and carboxymethyl substituent groups thus introduced being at least about 0.5 per anhydroglucose unit to produce a water-soluble carboxymethyl hydroxyethyl cellulose ether, the entire process being carried out in the presence of at least one organic solvent of the group consisting of the 3- and 4-carbon aliphatic alcohols, dioxane, tetrahydrofuran and the diethyl ether of ethylene glycol in a quantity sufficient to maintain the cellulose ether in a solid, undissolved state throughout the process.

8. A process for preparing a mixed carboxymethyl hydroxypropyl cellulose ether comprising first introducing into cellulose at least about 0.05 hydroxypropyl group per anhydroglucose unit by reacting cellulose with propylene oxide in the presence of caustic alkali, and subsequently, without separating the hydroxypropyl cellulose thus formed from the reaction mixture, introducing into said hydroxypropyl cellulose at least about 0.05 carboxymethyl group per anhydroglucose unit by reacting said hydroxypropyl cellulose with a carboxymethylating agent of the group consisting of monochloroacetic acid, the alkali salts thereof and mixtures thereof, the total amount of hydroxypropyl and carboxymethyl substituent groups thus introduced being at least about 0.5 per anhydroglucose unit to produce a water-soluble carboxymethyl hydroxypropyl cellulose ether, the entire process being carried out in the presence of at least one organic solvent of the group consisting of the 3- and 4-carbon aliphatic alcohols, dioxane, tetrahydrofuran and the diethyl ether of ethylene glycol in a quantity sufficient to maintain the cellulose ether in a solid, undissolved state throughout the process.

9. A process for preparing a mixed carboxymethyl hydroxybutyl cellulose ether comprising first introducing into cellulose at least about 0.05 hydroxybutyl group per anhydroglucose unit by reacting cellulose with butylene oxide in the presence of caustic alkali, and subsequently, without separating the hydroxybutyl cellulose thus formed from the reaction mixture, introducing into said hydroxybutyl cellulose at least about 0.05 carboxymethyl group per anhydroglucose unit by reacting said hydroxybutyl cellulose with a carboxymethylating agent of the group consisting of monochloroacetic acid, the alkali salts thereof and mixtures thereof, the total amount of hydroxybutyl and carboxymethyl substituent groups thus introduced being at least about 0.5 per anhydroglucose unit to produce a water-soluble carboxymethyl hydroxybutyl cellulose ether, the entire process being carried out in the presence of at least one organic solvent of the group consisting of the 3- and 4-carbon aliphatic alcohols, dioxane, tetrahydrofuran and the diethyl ether of ethylene glycol in a quantity sufficient to maintain the cellulose ether in a solid, undissolved state throughout the process.

10. A process for preparing a mixed carboxymethyl hydroxyethyl cellulose ether comprising first introducing into cellulose at least about 0.05 hydroxyethyl group per anhydroglucose unit by reacting cellulose with ethylene chlorohydrin in the presence of caustic alkali, and subsequently, without separating the hydroxyethyl cellulose thus formed from the reaction mixture, introducing into said hydroxyethyl cellulose at least about 0.05 carboxymethyl group per anhydroglucose unit by reacting said hydroxyethyl cellulose with a carboxymethylating agent of the group consisting of monochloroacetic acid, the alkali salts thereof and mixtures thereof, the total amount of hydroxyethyl and carboxymethyl substituent groups thus introduced being at least about 0.5 per anhydroglucose unit to produce a water-soluble carboxymethyl hydroxyethyl cellulose ether, the entire process being carried out in the presence of at least one organic solvent of the group consisting of the 3- and 4-carbon aliphatic alcohols, dioxane, tetrahydrofuran and the diethyl ether of ethylene glycol in a quantity sufficient to maintain the cellulose ether in a solid, undissolved state throughout the process.

11. A process for preparing a mixed carboxymethyl hydroxyethyl cellulose ether comprising first introducing into cellulose at least about 0.05 hydroxyethyl group per anhydroglucose unit by reacting cellulose with ethylene oxide in the presence of caustic alkali, and subsequently, without separating the hydroxyethyl cellulose thus formed from the reaction mixture, introducing into said hydroxyethyl cellulose at least about 0.05 carboxymethyl group per anhydroglucose unit by reacting said hydroxyethyl cellulose with monochloroacetic acid, the total amount of hydroxyethyl and carboxymethyl substituent groups thus introduced being at least about 0.5 per anhydroglucose unit to produce a water-soluble carboxymethyl hydroxyethyl cellulose ether, the entire process being carried out in the presence of isopropanol in a quantity sufficient to maintain the cellulose ether in a solid, undissolved state throughout the process.

12. A process for preparing a mixed carboxymethyl hydroxyethyl cellulose ether comprising first introducing into cellulose at least about 0.05 hydroxyethyl group per anhydroglucose unit by reacting cellulose with ethylene oxide in the presence of caustic alkali, and subsequently, without separating the hydroxyethyl cellulose thus formed from the reaction mixture, introducing into said hydroxyethyl cellulose at least about 0.05 carboxymethyl group per anhydroglucose unit by reacting said hydroxyethyl cellulose with monochloroacetic acid, the total amount of hydroxyethyl and carboxymethyl substituent groups thus introduced being at least about 0.5 per anhydroglycose unit to produce a water-soluble carboxymethyl hydroxyethyl cellulose ether, the entire process being carried out in the presence of tertiary butyl alcohol in a quantity sufficient to maintain the cellulose ether in a solid, undissolved state throughout the process.

13. A process for preparing a mixed carboxymethyl hydroxyethyl cellulose ether comprising first introducing into cellulose at least about 0.05 hydroxyethyl group per anhydroglucose unit by reacting cellulose with ethylene oxide in the presence of caustic alkali, and subsequently, without separating the hydroxyethyl cellulose thus formed from the reaction mixture, introducing into said hydroxyethyl cellulose at least about 0.05 carboxymethyl group per anhydroglucose unit by reacting said hydroxyethyl cellulose with monochloroacetic acid, the total amount of hydroxyethyl and carboxymethyl substituent groups thus introduced being at least about 0.5 per anhydroglucose unit to produce a water-soluble carboxymethyl hydroxyethyl cellulose ether, the entire process being carried out in the presence of dioxane in a quantity sufficient to maintain the cellulose ether in a solid, undissolved state throughout the process.

14. A mixed carboxy- and hydroxy-lower alkyl cellulose ether containing at least about 0.05 carboxyalkyl group and at least about 0.05 hydroxyalkyl group, the total carboxyalkyl and hydroxyalkyl substituent groups being at least about 0.5 per anhydroglucose unit, said cellulose ether being soluble in water, soluble in aqueous solutions having a pH of 0.2 and free of precipitation from a 1% water solution thereof when said water solution is treated with an equal weight of an aqueous salt solution of the group consisting of 10% barium chloride solution and 10% zinc nitrate solution, said cellulose ether being prepared in accordance with claim 1.

15. A mixed carboxymethyl hydroxymethyl cellulose ether containing at least about 0.05 carboxymethyl group and at least about 0.05 hydroxymethyl group, the total carboxymethyl and hydroxyethyl substituent groups being at least about 0.5 per anhydroglucose unit, said cellulose ether being soluble in water, soluble in aqueous solutions having a pH of 0.2 and free of precipitation from a 1% water solution thereof when said water solution is treated with an equal weight of an aqueous salt solution of the group consisting of 10% barium chloride solution and 10% zinc nitrate solution, said cellulose ether being prepared in accordance with claim 7.

EUGENE D. KLUG.

REFERENCES CITED

The following references are of record in the file of this patent:

UNITED STATES PATENTS

| Number | Name | Date |
| --- | --- | --- |
| 1,451,331 | Dreyfus | Apr. 10, 1923 |
| 2,110,526 | Lorand | Mar. 8, 1938 |
| 2,148,952 | Maxwell | Feb. 28, 1939 |
| 2,265,919 | Lilienfeld | Dec. 9, 1941 |
| 2,517,577 | Klug et al. | Aug. 8, 1950 |

OTHER REFERENCES

Worden: "Technology of Cellulose Ethers," vol. 3, 1933, page 1605.